(12) United States Patent
Jacobson et al.

(10) Patent No.: US 12,290,025 B2
(45) Date of Patent: May 6, 2025

(54) STALK CONDITIONER

(71) Applicant: DEERE & COMPANY, Moline, IL (US)

(72) Inventors: Marcus A. Jacobson, Ankeny, IA (US); Duane M. Bomleny, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 786 days.

(21) Appl. No.: 17/304,950

(22) Filed: Jun. 29, 2021

(65) Prior Publication Data

US 2022/0408652 A1   Dec. 29, 2022

(51) Int. Cl.
| | | |
|---|---|---|
| *A01D 34/835* | (2006.01) | |
| *A01D 43/08* | (2006.01) | |
| *A01D 45/02* | (2006.01) | |
| *A01D 75/18* | (2006.01) | |
| *A01D 82/02* | (2006.01) | |

(52) U.S. Cl.
CPC ............. *A01D 82/02* (2013.01); *A01D 43/08* (2013.01)

(58) Field of Classification Search
CPC .. A01B 61/046; A01D 34/44; A01D 34/8355; A01D 41/06; A01D 43/08; A01D 45/02; A01D 45/021; A01D 82/00; A01D 82/02
See application file for complete search history.

(56) References Cited

U.S. PATENT DOCUMENTS

| | | | | |
|---|---|---|---|---|
| 4,398,363 | A * | 8/1983 | Miskin | E02F 3/64 |
| | | | | 37/429 |
| 7,997,218 | B2 * | 8/2011 | Gengler | A01C 7/205 |
| | | | | 111/194 |
| 8,418,432 | B2 | 4/2013 | Shoup | |
| 8,567,167 | B2 | 10/2013 | Shoup | |
| 8,745,963 | B1 | 6/2014 | Shoup | |
| 8,858,110 | B2 | 10/2014 | Shoup | |
| 9,095,093 | B2 * | 8/2015 | Hyronimus | A01D 34/8355 |
| 9,655,302 | B2 | 5/2017 | Straeter | |
| 2014/0319253 | A1 | 10/2014 | Nurnberg et al. | |

(Continued)

FOREIGN PATENT DOCUMENTS

| | | |
|---|---|---|
| CN | 105519305 A | 4/2016 |
| CN | 105723926 A | 7/2016 |

OTHER PUBLICATIONS

Yetter Farm Equipment, 5000 Series Stalk Devastator Accessories, dated Aug. 2020, pp. 1-20.

(Continued)

*Primary Examiner* — Thomas B Will
*Assistant Examiner* — Robert E Pezzuto

(57) ABSTRACT

In some instances, stalk conditioners for conditioning stalk stubble present in a field after harvesting of a crop may include a bracket configured to be secured to a piece of agricultural equipment, such as an implement; an arm pivotably coupled to the bracket; and a blade that is disposed in a slot formed in the arm. The blade may be rotatable relative to the arm. The blade and arm may be configured to engage stalks stubble within a field following harvesting of crops, including during the course of a harvesting operation, to break and cut the stalks so as to promote decomposition of the stalk stubble.

19 Claims, 15 Drawing Sheets

(56) References Cited

U.S. PATENT DOCUMENTS

| | | | |
|---|---|---|---|
| 2015/0129262 A1* | 5/2015 | Kovach | A01B 15/16 |
| | | | 172/558 |
| 2016/0066504 A1* | 3/2016 | Holman | A01D 34/8355 |
| | | | 56/504 |
| 2018/0042180 A1 | 2/2018 | Shane et al. | |
| 2019/0021207 A1* | 1/2019 | Martin | A01B 35/16 |
| 2021/0144921 A1 | 5/2021 | Shane | |

OTHER PUBLICATIONS

John Deere Harvesting Corn Heads C6R Corn Head, pp. 1-5, [retrieved on May 10, 2021]. Retrieved from the Internet: <URL: https://www.deere.com/en/harvesting/corn-heads/c6r-corn-head/>.
Orthman, Residue Management, pp. 1-9. (No date).
Buffalo no-till planter in Red Oak, pp. 1-27, [retrieved on Jul. 20, 2021]. Retrieved from the Internet: <URL: https://www.purplewave.com/auction/160914/item/K8466>.

\* cited by examiner

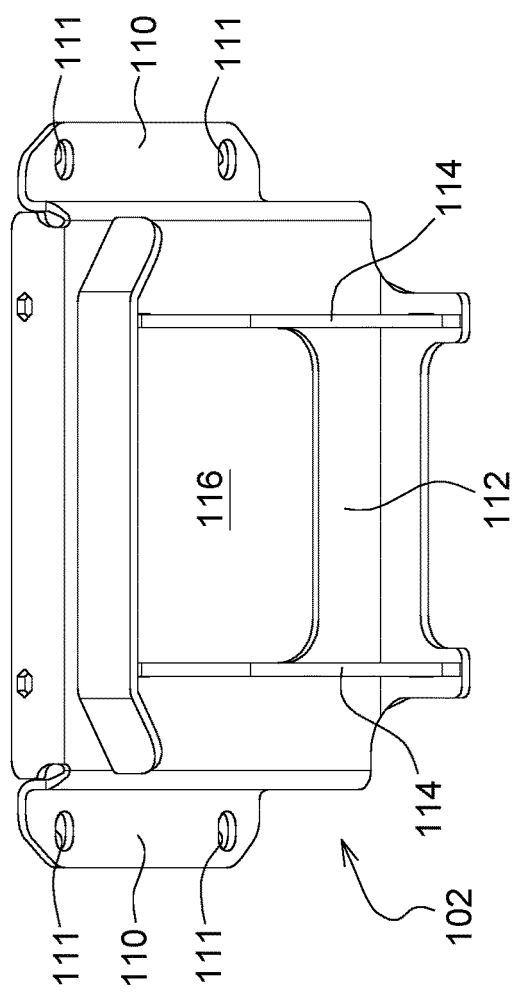
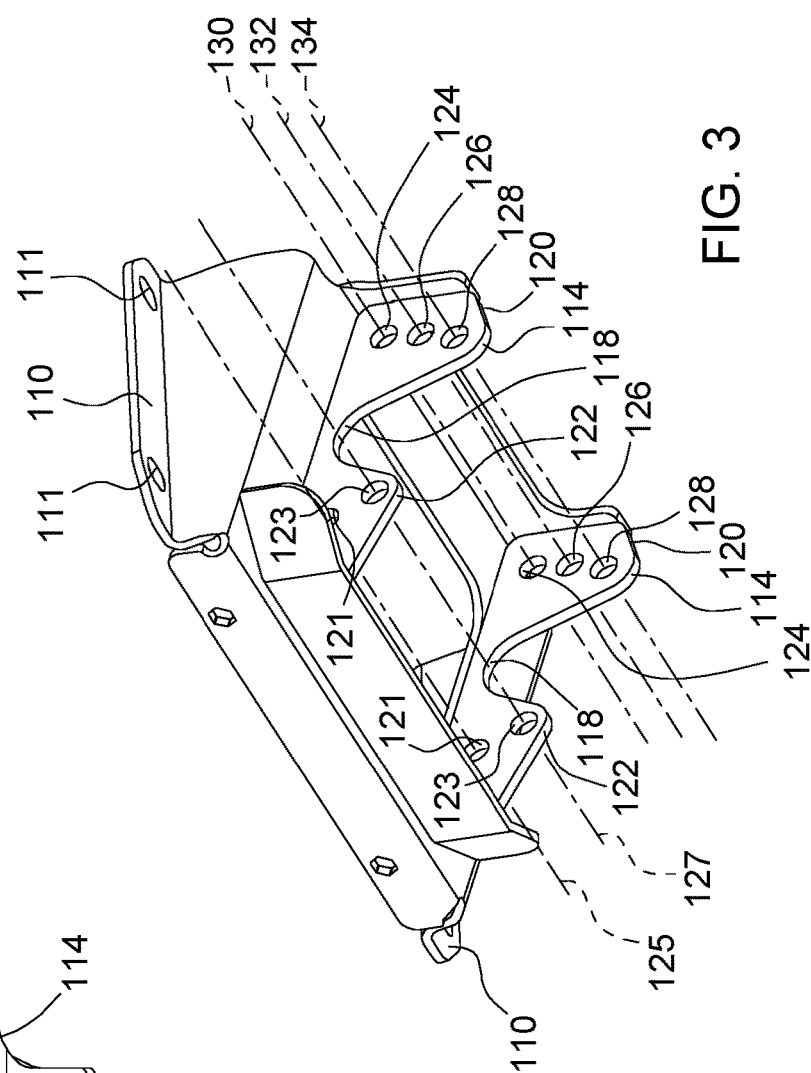

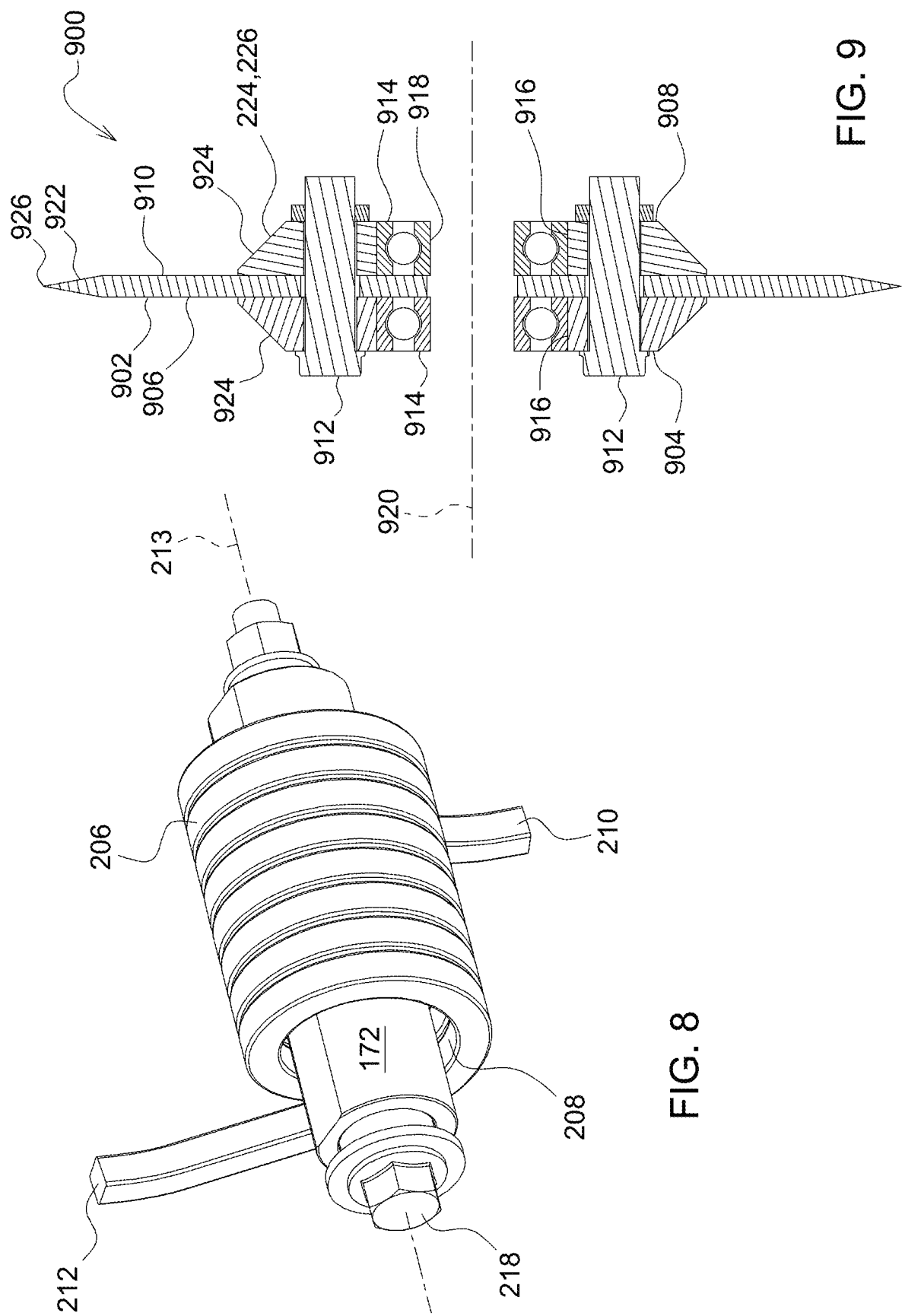

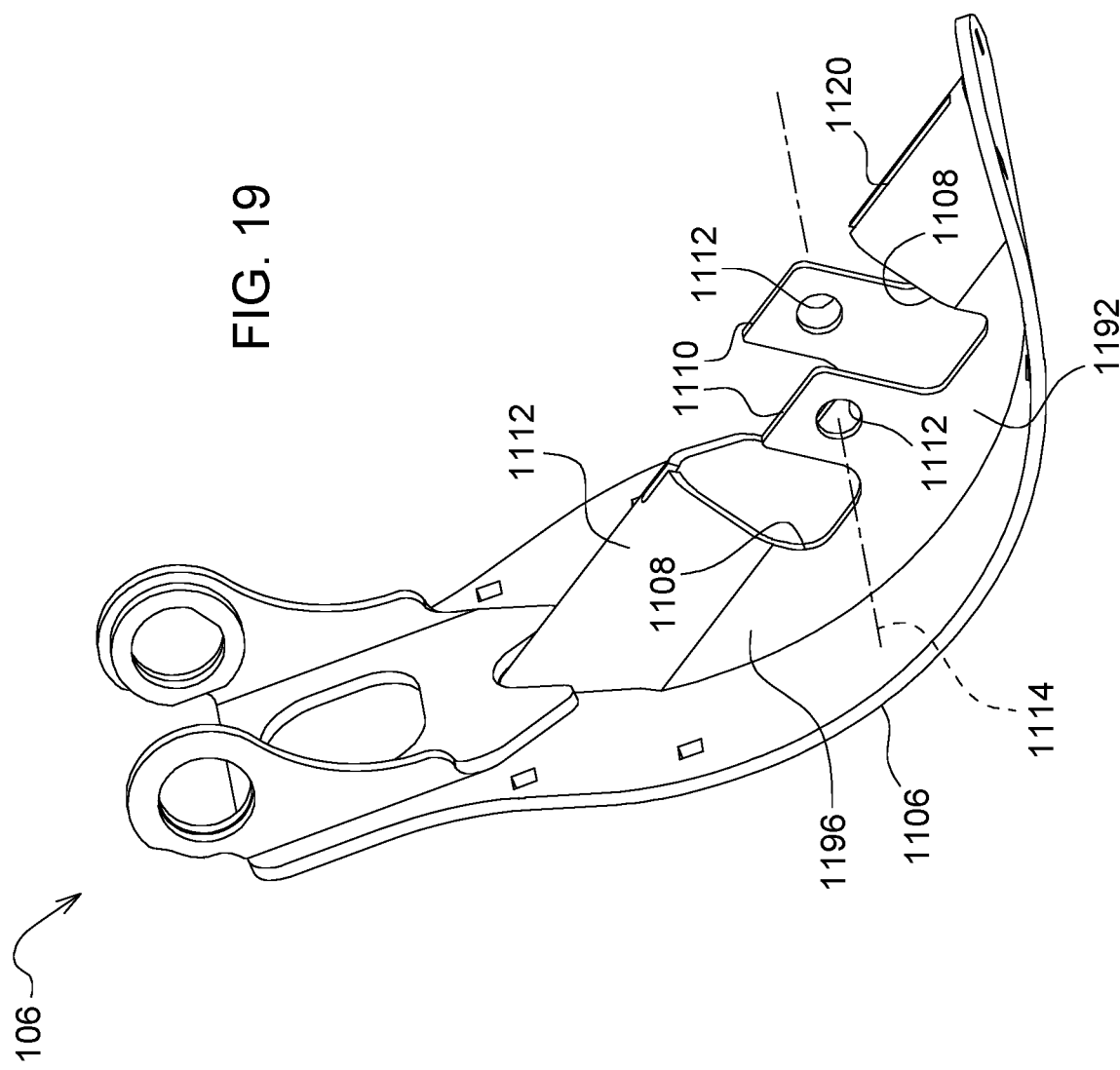

STALK CONDITIONER

FIELD OF THE DISCLOSURE

The present disclosure relates generally to conditioning crop stalks.

BACKGROUND OF THE DISCLOSURE

During crop harvesting, an agricultural implement, generally attached to an agricultural machine, such as a combine harvester or a tractor, severs crops from the ground using a cutter. The portion of the crops severed from the ground are captured and delivered to an unloading location. In some instances, the severed crop material is processed during harvesting, such as by a combine harvester. The crop stalk stubble remains attached to the ground. This stalk stubble aids in preventing erosion of the soil.

SUMMARY OF THE DISCLOSURE

A first aspect of the present disclosure is directed to a stalk conditioner to deflect and cut crop stalks extending from the ground. The stalk conditioner may include a first bracket; an arm coupled to the first bracket and pivotable relative thereto; and a blade rotatably coupled to the arm.

A second aspect of the present disclosure is directed to a stalk conditioner to deflect and cut crop stalks extending from the ground. The stalk conditioner may include a first bracket configured to be mounted to a piece of agricultural equipment; a second bracket received into the first bracket; an arm pivotably coupled to the second bracket, and a blade received into the longitudinally extending slot and rotatable relative to the arm. The first bracket may include a mounting surface; a first lateral side extending from the mounting surface; a second lateral side extending from the mounting surface, the second lateral side laterally offset from the first lateral side; a first plurality of aligned aperture sets formed through the first lateral side and the second lateral side at first end portions thereof; and a second plurality of aligned aperture sets formed through the first lateral side and the second lateral side at second end portions thereof. The second bracket may include a first lateral side positioned adjacent to the first lateral side of the first bracket; a second lateral side positioned adjacent to the second lateral side of the second bracket; first aligned apertures formed in the first lateral side and the second lateral side, the first aligned apertures alignable with any of the first plurality of aligned aperture sets of the first bracket to alter an angular relationship between the first bracket and the second bracket; and second aligned apertures formed in the first lateral side and the second lateral side, the second aligned apertures alignable with any of the second set of aligned aperture sets of the first bracket to alter the angular relationship between the first bracket and the second bracket. The arm may be pivotably movable between a lowered position and a raised position and include a longitudinally extending slot.

The various aspects may include one or more of the following features. A second bracket may be interdisposed between the first bracket and the arm. A shaft may be coupled to the second bracket, and the arm may be pivotable on the shaft. The arm may be biased towards a lowered position by a resilient component. Displacement of the arm from the lower position to a raised position may increase a biasing force generated by the resilient component that act to restore the arm towards the lowered position. The resilient component may be a coil spring that defines a central passage, and the shaft may extend through the central passage of the coil spring. The first bracket may include a first lateral side and a second lateral side. Each of the first lateral side and the second lateral side may include a first end portion and a second end portion, opposite the first end portion. A first plurality of aligned aperture sets may be formed on one of the first end portion or the second end portion of the first lateral side and the second lateral side. A first pin that may be selectively receivable into the any of the first plurality of aligned aperture sets to adjust an angle of arm relative to the first bracket. The arm may include a first surface, and the blade may extend beyond the first surface. The first surface may be planar. The arm may include a base and a housing. The base may include a first side, a second side, and a curved portion. The housing may extend from the first side of the base, and a slot formed in the arm may extend through the base and the housing. The housing may include a first side extending longitudinally along the base; a second side longitudinally along the base and located adjacent to the first side; a first recess formed in the first side, the first recess defining a first tab; and a second recess formed in second side, the second recess defining a second tab. An axis of rotation of the blade may extend through the tabs. the arm may include a slot, and the blade may be received, at least partially, within the slot. The slot may be open at an end of the arm. The arm may include a wiper disposed adjacent to the blade. The wiper may conform to a shape of the blade. A roller may be included. The roller may include the blade and side portions disposed on opposing sides of the blade. The roller may include a plurality of traction features formed on an exterior surface thereof. The plurality of traction features may include a plurality of recesses.

Additionally, the various aspects may include one or more of the following features. The arm may include a planar base, and the slot may be formed in an end of the planar base. The blade may extend beyond the second side of the base. A first pin may be receivable into the any of the first plurality of aligned aperture sets of the first bracket and the first aligned apertures of the second bracket, and a second pin may be receivable into any of the second plurality of aligned aperture sets of the first bracket and the second aligned apertures of the second bracket.

Other features and aspects will become apparent by consideration of the detailed description and accompanying drawings.

BRIEF DESCRIPTION OF THE DRAWINGS

The detailed description of the drawings refers to the accompanying figures in which:

FIG. 2 is a front view of an example first bracket of the stalk conditioner of FIG. 1.

FIG. 3 is a perspective view of the first bracket of the stalk conditioner of FIG. 1.

FIG. 8 is a perspective view of an example resilient component, hollow shaft, and associated example fastener of the stalk conditioner of FIG. 1.

FIG. 9 is a cross-sectional view of an example blade of a stalk conditioner, according to some implementations of the present disclosure.

FIG. 19 is a perspective view of an example arm of the stalk conditioner of FIG. 11.

DETAILED DESCRIPTION

Figure 1:
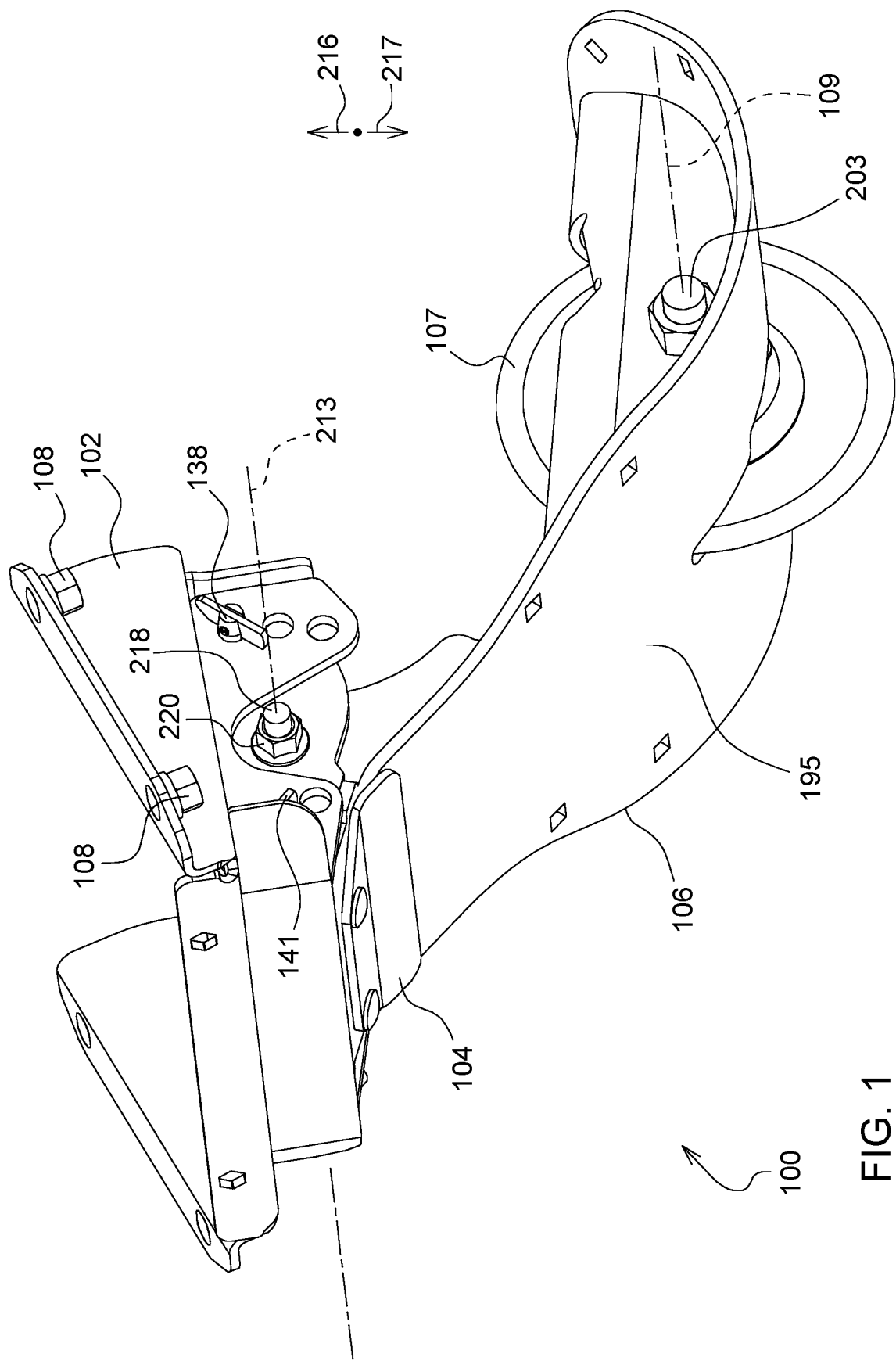
FIG. 1 is a perspective view of an example stalk conditioner, according to some implementations of the present disclosure

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

After a harvesting operation, crop stalk stubble remains attached to the field. The stalk stubble provides a benefit in preventing or reducing erosion of the soil. Particularly, the root system attached to the stalk stubble acts to stabilize the soil. The stalk stubble can also act to retain moisture, such as by collecting snow during the winter. As the temperatures increase, the snow melts in place to provide for moisture to the soil. However, stalk stubble can pose problems, particularly for subsequent agricultural operations. For example, unconditioned stalk stubble and exposed root structure can reflect heat and retain moisture, producing an insulative effect that promotes cool, damp soil. Cool, damp soil can be undesirable during a growing season. Providing for decomposition of stalk stubble promotes heat absorption, and heat absorption is beneficial to crops during a growing season. Further, the stalk stubble can interfere with subsequent planting or seeding operations. Particularly, stalk stubble can interfere with accurate placement of seeds as well as soil-to-seed contact, which can affect crop emergence and yield. Stalk stubble can also cause damage to a vehicle, e.g., tractors, such as by causing damage to vehicle tires.

The present disclosure provides for maintaining the benefits of retaining stalk stubble in the ground while also deflecting, breaking, or crushing the stalk stubble along with cutting or splitting the stalks (collectively referred to as "stalk conditioning") to promote decomposition of the stalk material. Further, this conditioning of the stalks can be accomplished during a harvesting operation. More particularly, this conditioning of the stalks is accomplished by one or more devices coupled to a harvesting machine or harvesting implement to condition the stalks after severing of the crop material for collection. Additionally, the present disclosure provides for stalk conditioning while the stalk stubble remains firmly held by the soil. Engaging the stalk stubble in this way provides improved results compared to attempting to condition stalk stubble when the stalk material is disconnected form the soil.

FIG. 1 is a perspective view of an example stalk conditioner 100. The stalk conditioner 100 includes a first bracket 102, a second bracket 104 coupled to the first bracket 102, an arm 106 that is pivotable relative to both the first bracket 102 and the second bracket 104, and a blade 107 that is rotatably coupled to the arm 106. The arm 106 carries the blade 107, and the blade 107 is rotatable relative to the arm 106. The blade 107 is rotatable about an axis 109. Referring to FIGS. 1 and 2, the first bracket 102 and, hence, the stalk conditioner 100, is connectable to a machine, such as an agricultural vehicle or an agricultural implement, via fasteners or in another manner. In the illustrated example, the first bracket 102 includes four nuts 108 that abut laterally extending flanges 110 and align with apertures 111 formed in the flanges 110. In some instances, the nuts 108 are secured to the flanges 110, such by welding or an adhesive. Each of the nuts 108 threadably engages a corresponding bolt passed through the respective aperture 111 to secure the first bracket 102 and, consequently, the stalk conditioner 100 to an agricultural machine, such as to an agricultural implement or vehicle. In other implementations, the first bracket 102 is attachable to an agricultural machine in other ways, such as by being received into a slot that accepts the flanges 110, being received into an opening formed in an implement, or in another way.

Referring to FIGS. 2 and 3, the first bracket 102 also includes a base 112 and lateral sides 114. In the illustrated example, the base 112 forms an opening 116. In other implementations, the opening 116 is omitted. The lateral sides 114 extend longitudinally and are laterally displaced from each other. Each of the lateral sides 114 include a notch 118 that are laterally aligned with each other. The notch 118 divides the lateral sides 114 into a first end portion 120 and a second end portion 122 and accommodates fasteners or other components used to secure the arm 106 to the second bracket 104, as discussed in more detail below. The first end portions 120 of the lateral sides 114 include a first plurality of aligned aperture sets 124, 126, and 128. Each set of aligned apertures are laterally aligned such that each of the aligned apertures lie along a common axis. As shown, the aligned aperture sets 124, 126, and 128 are aligned along common axes 130, 132, and 134, respectively. In this example, three sets of aligned apertures are provided. In other implementations, fewer or additional sets of aligned apertures can be provided. The first end portions 122 of the sides 114 also include a plurality of aligned aperture sets 121 and 123. Similar to the aligned aperture sets 124, 126, and 128, the aligned aperture sets 121 and 123 are aligned along common axes 125 and 127, respectively.

Referring to FIG. 1, a first pin 138 is selectively received into the aligned aperture sets 124, 126, and 128. The particular set 124, 126, or 128 of aligned apertures into which the first pin 138 is received is selected to alter an angular relationship between the first bracket 102 and the second bracket 104. A second pin 141 is selectively received into the aligned aperture sets 121 and 123. The particular set 121 and 123 of aligned apertures into which the second pin 141 is received is selected also to alter the angular relationship between the first bracket 102 and the second bracket 104.

Figure 4:
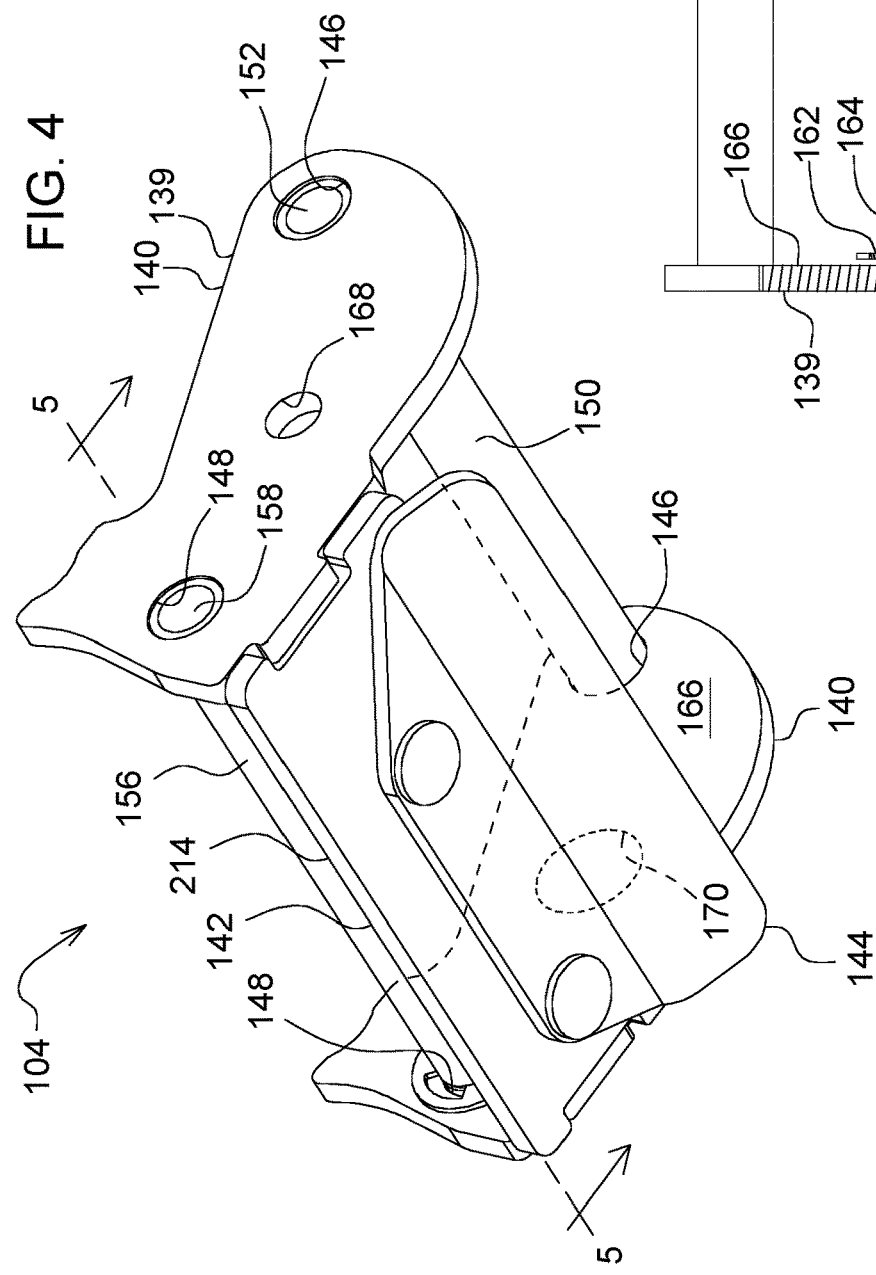
FIG. 4 is a perspective view of an example second bracket of the stalk conditioner of FIG. 1.

FIG. 4 is a perspective view of the second bracket 104. The second bracket 104 includes a body 139 having lateral sides 140 connected by a bridge portion 142 that extends between the lateral sides 140. A tab 144 extends from the bridge portion 142 at an oblique relative angle thereto. In the illustrated example, the tab 144 is a separate component from the bridge portion 142 and is coupled to the bridge portion 142 via fasteners. In other implementations, the tab 144 is integral to the bridge portion 142. The tab 144 engages the arm 106 when the arm 106 is in a fully lowered position. Thus, the tab 144 acts as a stop to prevent the arm 106 from pivoting beyond a selected amount.

The second bracket 104 is received into the first bracket 102 between the lateral sides 114 such that the lateral sides 140 of the second bracket 104 are inboard of and adjacent to respective lateral sides 114 of the first bracket 102. The second bracket 104 also includes first aligned apertures 146 and second aligned apertures 148 formed in the lateral sides 140. The first aligned apertures are arranged to align selectively with the aligned aperture sets 124, 126, and 128 of the first bracket. The second aligned apertures 148 are arranged to align selectively with the aligned aperture sets 121 and 123.

A first hollow shaft 150 is received into and extends between the first aligned apertures 146. A bore 152 formed in the first hollow shaft 150. The first pin 138 is received into the bore 152 and the first aligned apertures 146. In some implementations, the first hollow shaft 150 is fixedly coupled to the lateral sides 114 140, such as by welding, friction fit, or an adhesive. In other implementations, the first hollow shaft 150 is removable from the body 139. When the first aligned apertures 146 are aligned with one of the aligned aperture sets 124, 126, and 128, the first pin 138 is received thereinto (and through bore 152) to define, at least partially, the angular relationship between the first bracket 102 and the second bracket 104.

A second hollow shaft 156 is received into and extends between the second aligned apertures 148. The second hollow shaft 156 includes a bore 158. The bore 158 receives the second pin 141. In some implementations, the second hollow shaft 156 is fixedly coupled to the lateral sides 140, such as by welding, friction fit, or an adhesive. When the second aligned apertures 148 are aligned with one of the aligned aperture sets 121, 123, the second pin 141 is received thereinto (and through bore 158) to define, at least partially, the angular relationship between the first bracket 102 and the second bracket 104.

Figure 5:
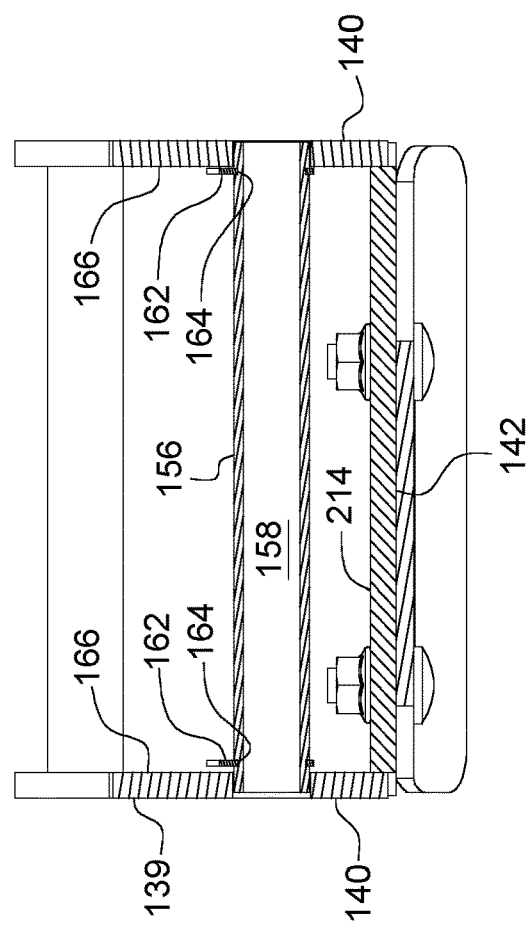
FIG. 5 is a cross-sectional view of an example second bracket and assembled hollow shaft, according to some implementations of the present disclosure.

In other implementations, the second hollow shaft 156 is removable from the body 139. For example, in some instances, the second hollow shaft 156 has an outer diameter size that corresponds to an inner diameter size of the second aligned apertures 148, as shown in FIG. 5. When installed in the second aligned apertures 148, such as by sliding the second hollow shaft 156 laterally into the aligned apertures 148 from one side towards the other, retainer clips 162 are received onto the second hollow shaft 156, such as in grooves 164 formed therein. The retainer clips 162 are positioned adjacent to interior surfaces 166 of the lateral sides 140 near the respective ends of the second hollow shaft 156. Installation of the retainer clips 162 retains the second hollow shaft 156 within the second aligned apertures 148 and onto the second bracket 104. Removal of the retainer clips 162 permits removal of the second hollow shaft 156 from the second bracket 104. In some implementations, the first hollow shaft 150 is removably coupled to the second bracket 104 in a similar manner.

Figure 6:
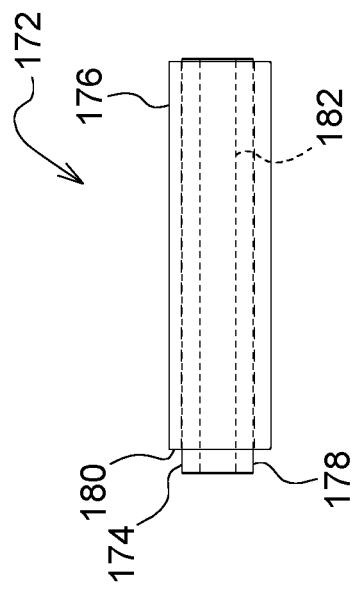
FIG. 6 is a side view of an example hollow shaft having a reduced diameter portion, according to some implementations of the present disclosure.

The second bracket 104 also includes third aligned apertures 168, 170. In the illustrated example, the third aligned apertures 168, 170 have different sizes, i.e., different diameters. The aperture 168 has a smaller diameter size compared to aperture 170. The third aligned apertures 168, 170 receive a third hollow shaft 172, shown in FIG. 6. The third hollow shaft 172 includes a first end portion 174 and a second end portion 176. The first end portion 174 has a reduced diameter portion 178 that defines a shoulder 180. The reduced diameter portion 178 has a diameter size that corresponds with that of the aperture 168. The reduced diameter portion 178 is received into the aperture 168. When the reduced diameter portion 178 is inserted into the aperture 168, the shoulder 180 abuts the interior surface 166 of the lateral side 140.

The diameter size of the aperture 170 corresponds to the diameter size of the second end portion 176 of the third hollow shaft 172 such that the second end portion 176 is receivable into the aperture 170. During assembly, the first end portion 174 of the third hollow shaft 172 is inserted into the aperture 170 and moved laterally towards the lateral side 140 containing the aperture 168. The reduced diameter portion 174 is inserted into the aperture 168 so that the interior surface 166 abuts the shoulder 180. The third hollow shaft 172 defines a bore 182. The bore 182 receives a pin, such as in the form of a fastener (e.g., a bolt), to secure the arm 106 to the second bracket 104, described in greater detail below.

Figure 7:
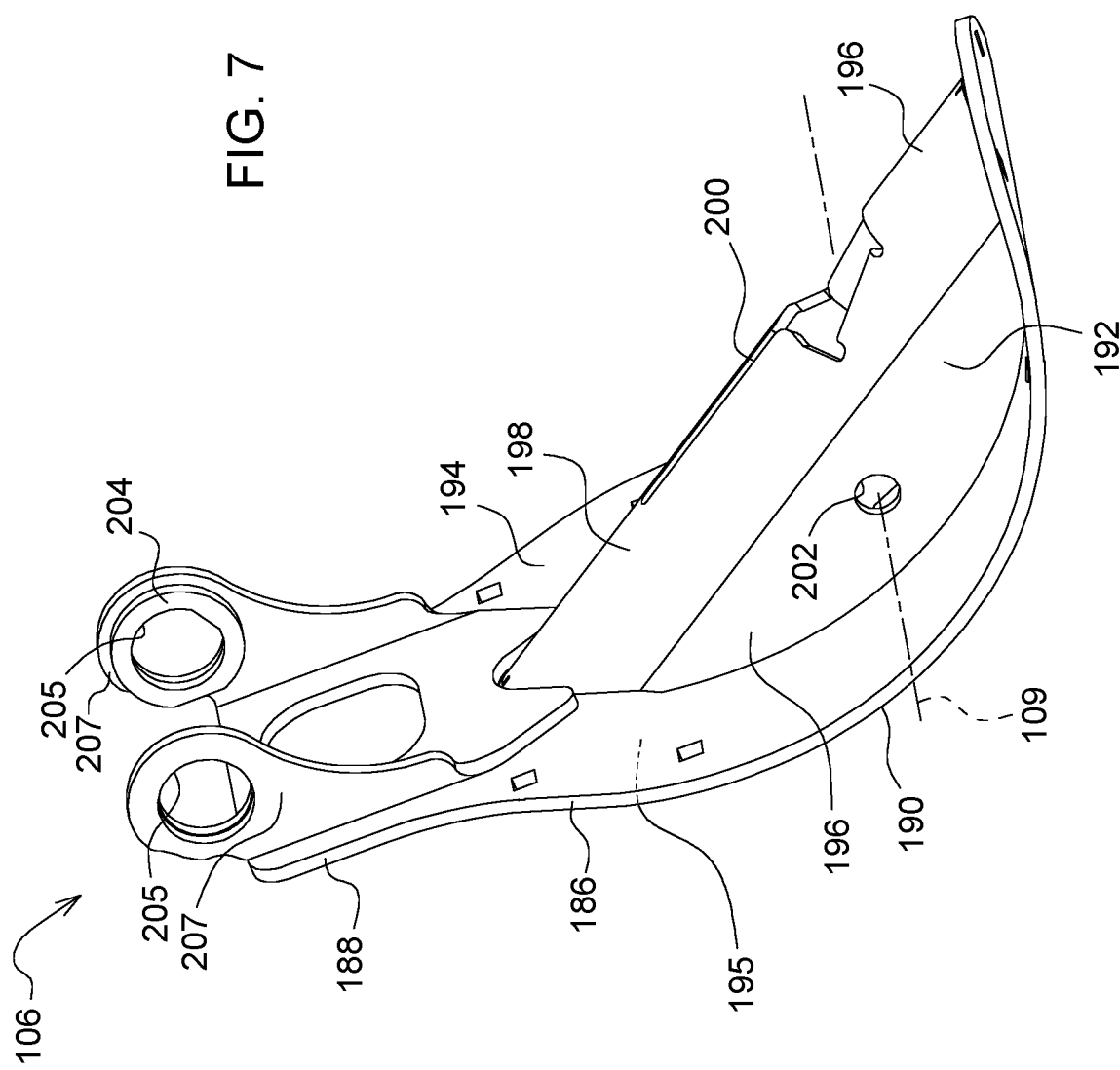
FIG. 7 is a perspective view of an example arm of the stalk conditioner of FIG. 1.

FIG. 7 is a perspective view of the example arm 106. The arm 106 includes a base 186 having a first end portion 188 and a second end portion 190. In the illustrated example, the first end portion 188 is planar, and the second end portion 190 is curved. The curvature provided by the second end portion 190 provides for contact between the arm 106 and the ground or objects on the ground, e.g., stalk stubble, even as the arm 106 is pivotably displaced about axis of rotation 213 (shown in FIGS. 1 and 8). The arm 106 also includes a housing 192 that extends from a first side 194 of the base 186. A second side 195 of the base 186, opposite the first side 194, is configured to engage the ground or another object, e.g., stalk stubble or rocks, during an agricultural operation. The housing 192 includes opposing sides 196 that are joined at a ridge 198. A slot 200 formed in the arm 106 extends along and through the ridge 198 of the housing 192 and through the base 186. The slot 200 is sized to accommodate the blade 107, shown in FIG. 1. The housing 192 also defines aligned apertures 202 formed in the respective sides 196. A shaft 203 (shown in FIG. 1), such as in the form of a bolt, is received through the aligned apertures 202 and defines the axis of rotation 109. The blade 107 is rotatable on the shaft 203 about the axis of rotation 109.

The arm 106 also includes a bracket 204 provide on the first end portion 188 of the base 186. In the illustrated example, the bracket 204 is coupled to the first side 194 of the base 186. In other implementations, the bracket 204 is integral to the base 186. The bracket 204 includes sides 207 having openings 205 formed therein. The bracket 204 functions to pivotably couple the arm 106 to the second bracket 104 via the third hollow shaft 172 that is received through the openings 205 formed in the bracket 204.

The stalk conditioner 100 also includes a resilient component that biases the arm 106 into a lowered position. In an undeflected configuration, the resilient component urges the arm 106 into contact with the tab 144 of the second bracket 104. FIG. 8 shows an example implementation of the resilient component. Particularly, the resilient component shown in FIG. 8 is a coil spring 206. The coil spring 206 defines a central passage 208 that accommodates the third hollow shaft 172. A first end 210 of the coil spring 206 engages with the first side 194 of the base 186 of the arm 107 106, and a second end 212 of the coil spring 206 engages with a surface 214 of the bridge 142 of the second bracket 104. In this way, the coil spring 206 operates to urge the arm 106 into abutting contact with the tab 144 of the second bracket 104, placing the arm 106 and the blade 107 in a fully lowered position. Displacement of the arm 106 about axis 213 defined by the third hollow shaft 172 in the direction of arrow 216 (shown in FIG. 1) results in increased tension in the coil spring 206 and an increase in a restorative force that urges the arm 106 back into abutting contact with the tab 144 in the direction of arrow 217.

The sides 207 of the bracket 204 of the arm 106 is received between the sides 140 of the second bracket, with the openings 205 aligned with the third aligned apertures 168, 170. The third hollow shaft 172 is received through the aperture 170 in the second bracket 104, through one of the openings 205, through the central passage 208 formed by the coil spring 206, and through the second opening 205, with the reduced diameter portion 178 of the third hollow shaft 172 received into the aperture 168. A pin, such as in the form of a fastener (e.g., bolt 218) (shown in FIG. 1), is received through the bore 182 of the third hollow shaft 172. In some implementations, a nut 220 is threadably received onto the bolt to secure the arm 106 and the coil spring 206 to the second bracket 104. As a result, the arm 106 is pivotably mounted to the second bracket 104, which is secured to the first bracket 102 in a desired angular orientation relative thereto by the first and second pins 138 and 141.

FIG. 9 is a cross-sectional view of the example blade 900. The blade 900 is similar to the blade 107 described earlier. The blade 900 is an assembly that includes a blade 902, a first hub portion 904 disposed on a first side 906 of the blade 902, and a second hub portion 908 disposed on a second side 910 of the blade 902. The first and second hub portions 904 and 908 are secured to the blade portion by fasteners 912. Example fasteners include bolts, nuts, screws, or pins.

Bearings 914 are received into openings 916 formed in the first and second hub portions 904 and 908. In some instances, the bearings 914 are attached to the first and second hub portions 904 and 908 via a press fit. However, the bearings 914 may be secured to the first and second hub portions 904 and 908 in other ways. In still other implementations, a single bearing, such as a single centrally located bearing may be used. The bearings 914 and blade 902 define a central passage 918 through which a shaft, which may be similar to shaft 203 or 1116, is received for rotation of the blade 900 thereon about an axis of rotation 920, similar to axis of rotation 109, defined by the passage 918. In other implementations, one or more bushings can be used in place of or in combination with one or more bearings. In still other implementations, other types of bearing components or bearing material can be used or, alternatively, bearing materials or components may be omitted. For example, in some instances, the blade may directly engage a surface of the shaft on which the blade is rotatable.

In other implementations, the blade 900 may be of a unitary design in which the blade 902 and the first and second hub portions 904 and 908 form a unitary component. One or more bearings may be included to facilitate rotation of the blade relative to an arm, such as arm 106.

The blade 902 is disc-shaped and includes a tapered portion 922. The first and second hub portions 904 and 908 includes a sloped portion 924. In the illustrated example, the tapered portion 922 forms a circular edge 926 and functions to slice and split stalks, particularly along a longitudinal axis of stalks attached to the ground. Cuts to the stalk made in this way run parallel to the fibers of the stalk and promote intrusion of bacteria and decomposition of the stalk. Further, cuts made parallel to the stalk fibers require less force to form. The sloped portions 924 of the first and second hub portions 904 and 908 cooperate to expand and propagate the cut formed in the stalks by the tapered portion 922. By further propagating the cut, decomposition of the stalk is further accelerated by providing increased exposure of the internal fibers of the stalks to the environment. In some implementations, the sloped portions 924 are omitted. The blade 902 also includes a passage 918 through which a shaft, such as shaft 203, extends. The blade 902 is rotatable on the shaft about an axis, such as axis 109.

As shown in FIG. 1, the blade 107 extends beyond the second side 195 of the base 186 of the arm 106. The blade 107 also extends beyond the housing 192 of the arm 106. In some implementations, the slot 200 forms an opening have in a uniform cross-sectional shape, as shown in FIG. 7. In some implementations, the slot 200 has a shape that conforms to the cross-sectional shape of the blade 107, as shown, for example, in FIG. 1.

In operation, during harvesting of a crop, an implement may include a plurality of stalk conditioners, such as stalk conditioner 100, coupled thereto and aligned with stalk cutters. Generally, the stalk cutters are aligned with crop rows and, hence, crops within the crop rows. Consequently, the stalk conditioners are also aligned with the crops. Generally, the stalk conditioner is positioned rearward or downstream of a stalk cutter so that the stalk conditioner interacts with the stalk stubble left attached to the ground. The implement severs the crops at a location along the stalk. In some implementations, the severed crop material is transported to another location by the implement, such as for additional processing within a combine harvester, to a storage bin, or to another vehicle for subsequent transportation elsewhere. As the implement is moved past a stalk stubble, an arm of the stalk conditioner, such as arm 106, or blade of the stalk conditioner, such as blade 107, or both applies a downward force imparted by a resilient components, such as the coil spring 206, onto the stalk. This applied force operates both to slice the stalk longitudinally along a length of the stalk (by operation of the blade) and break or crush the stalk, such as be engagement of the stalk with a first side, such as first side 194, of the base of the arm. As mentioned earlier, this interaction or conditioning of the stalk with the stalk conditioner promotes decomposition of the stalks while maintaining soil stability due to roots of the stalk remaining in place in the ground. Further, breaking or crushing the stalks in this manner also reduces the risk of vehicle tire damage caused by the stalk stubble remaining in the field after harvest.

In some instances, a plurality of stalk conditioners within the scope of the present disclosure, such as stalk conditioner 100, are attached to a harvesting machine. Each stalk conditioners is aligned with row of crop. For example, in some implementations, the plurality of stalk conditioners are attached to a header, such as a corn header, and are aligned with each row unit of the header used to harvest the crop provided in rows. As a result, as the harvesting machine moves through the field to harvest, the stalk conditioners are precisely aligned with the stalk stubble that remain attached to the soil. Thus, as the harvesting machine continues to harvest, the stalk conditioners engage the stalk stubble immediately following harvesting of the crop to slice and break the stalks. As a consequence, decomposition of the stalk stubble is promoted, and the risk of damage to agricultural equipment, such as tractors or combines, (e.g., tire damage) is reduced.

Figure 10:
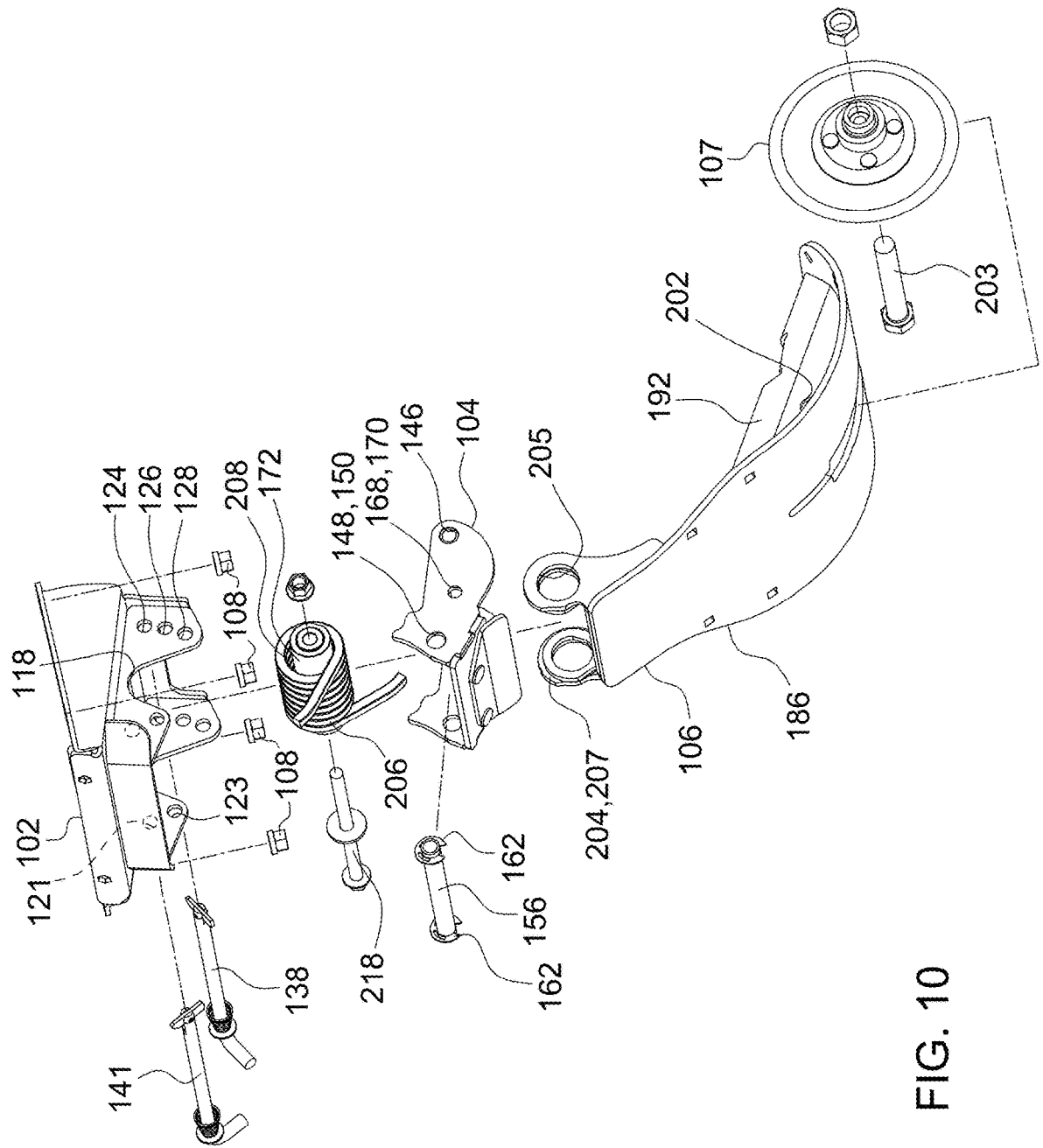
FIG. 10 is an exploded view of the example stalk conditioner of FIG. 1
Figure 11:
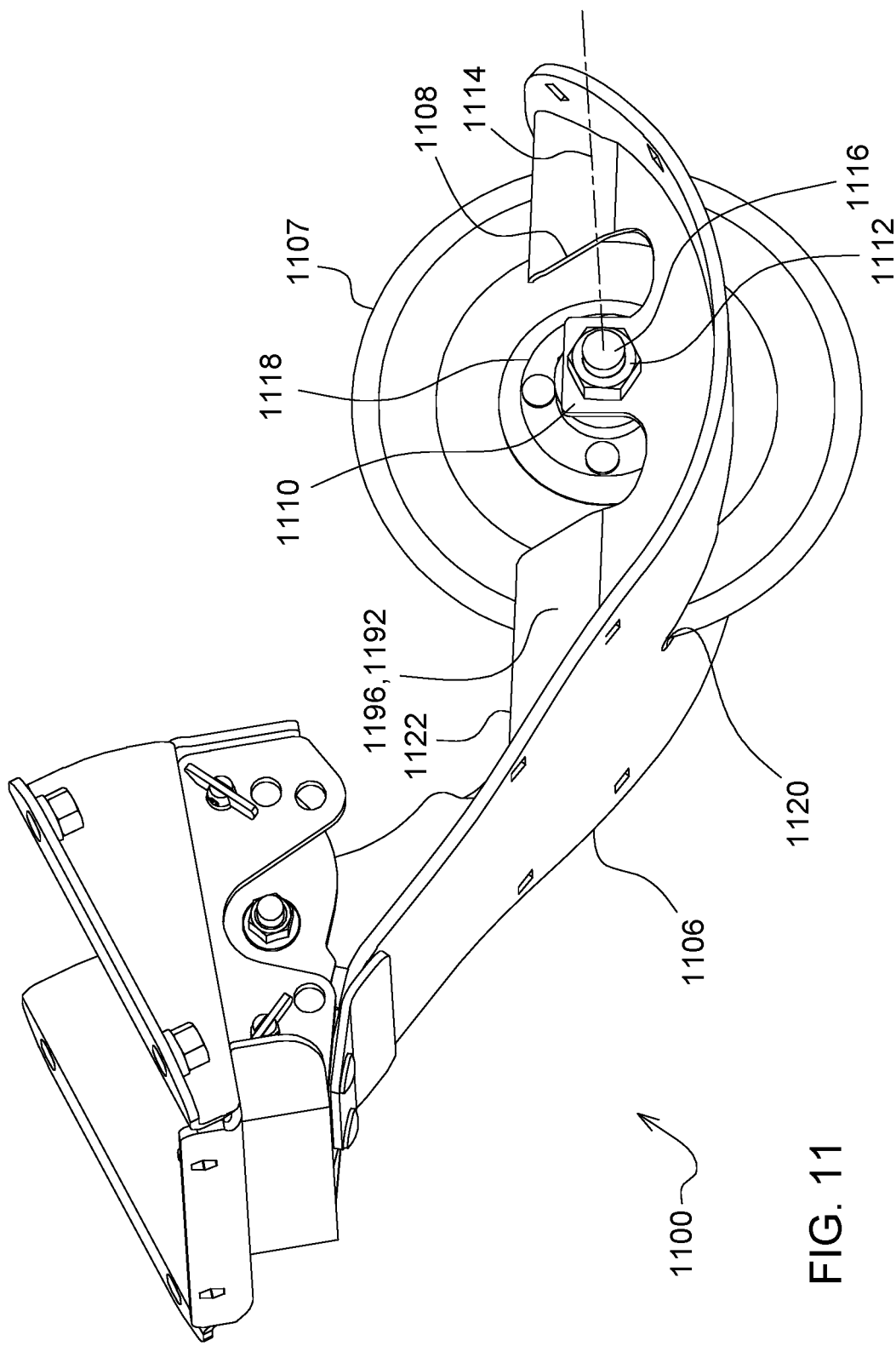
FIG. 11 is a perspective view of another example stalk conditioner, according to some implementations of the present disclosure.

FIG. 10 is an exploded view of the example stalk conditioner 100. FIG. 11 is a perspective view of another example stalk conditioner 1100. The stalk conditioner 1100 is similar to the stalk conditioner 100, except as described. Particularly, an arm 1106 and blade 1107 of the stalk conditioner 1100 vary from that of the stalk conditioner 1100 as described below and illustrated in the relevant figures. A perspective view of the arm 1106 is shown in FIG. 19. For example, the arm 1106 includes recesses 1108 formed into sides 1196 of a housing 1192 of the arm 1106. The recesses 1108 are laterally aligned and define tabs 1110 that are also laterally aligned. The tabs 1110 include apertures 1112 that define an axis 1114 of rotation and receive a shaft 1116 on which the blade 1107 is rotatable. As shown in FIG. 10, the recesses 1108 provide a relief for hub portions 1118 that form part of the blade 1107. Further, the recesses 1108 provide for improved access to and replacement of the blades 1107. A slot 1120 extends through the arm 1106 along a ridge 1122 of the housing 1192 and intersects the recesses 1108.

The blade 1107 also varies from the blade 107 and blade 900. For example, the blade 1107 has an increased size, e.g., diameter compared to blade 107 and a different construction. Further, in the illustrated example, the blade 1107 omits a sloped portion on hub portions 1118 that is similar to the sloped portion 924 of the blade 900. In other implementations, the blade 1107 includes sloped portions.

Figure 12:
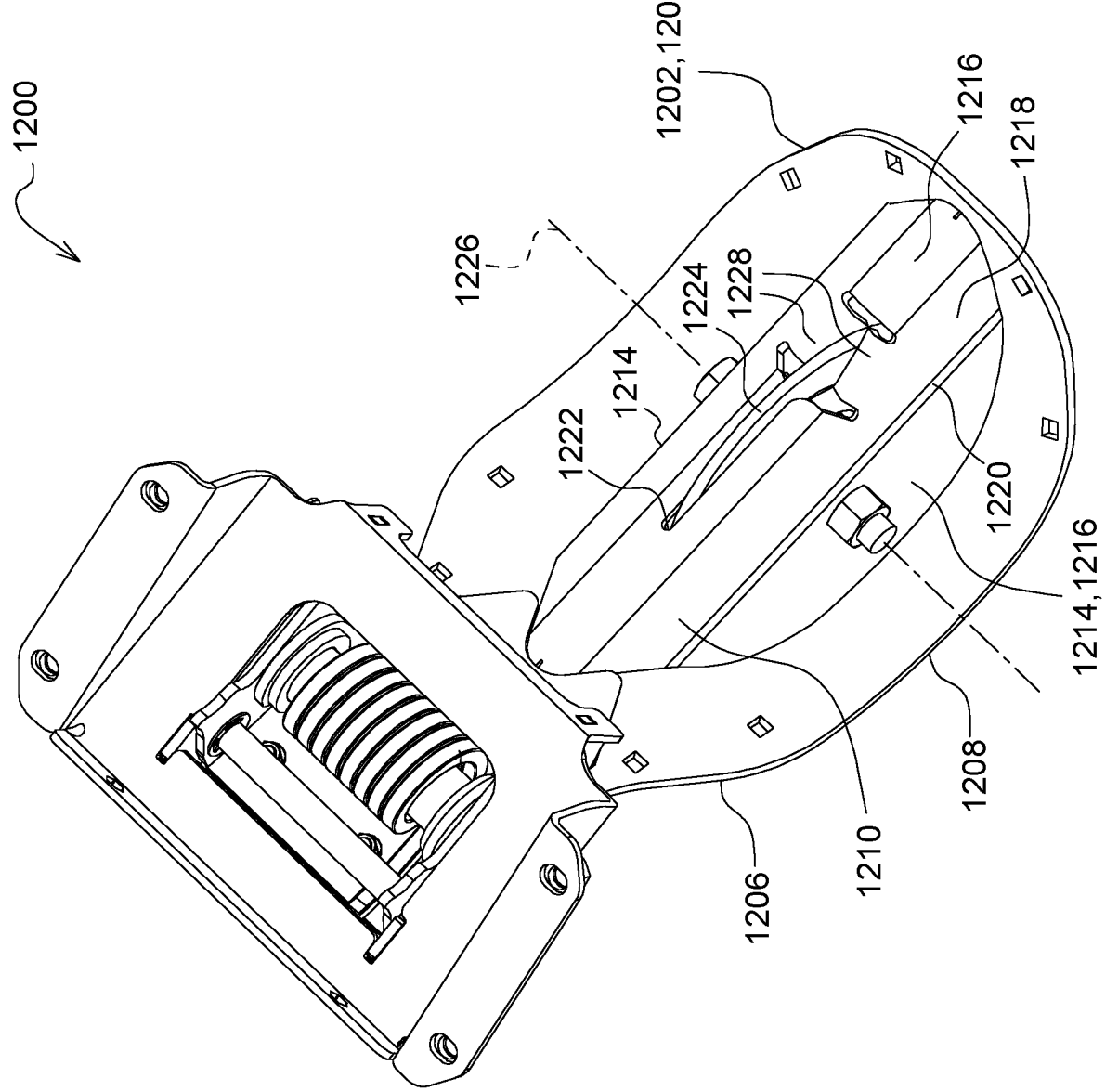
FIG. 12 is a perspective view of another example stalk conditioner, according to some implementations of the present disclosure.
Figure 13:
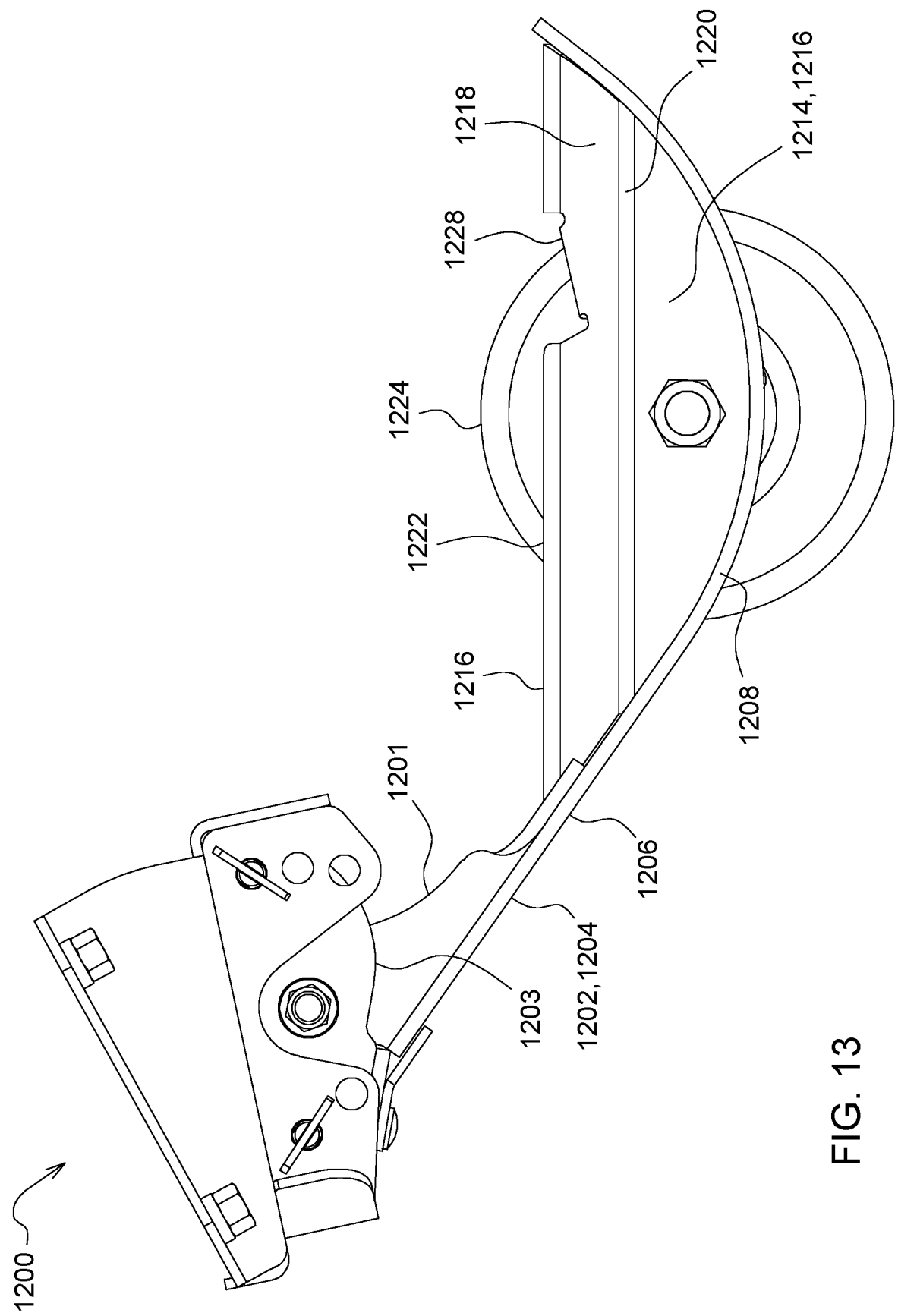
FIG. 13 is a side view of the stalk conditioner of FIG. 12.
Figure 14:
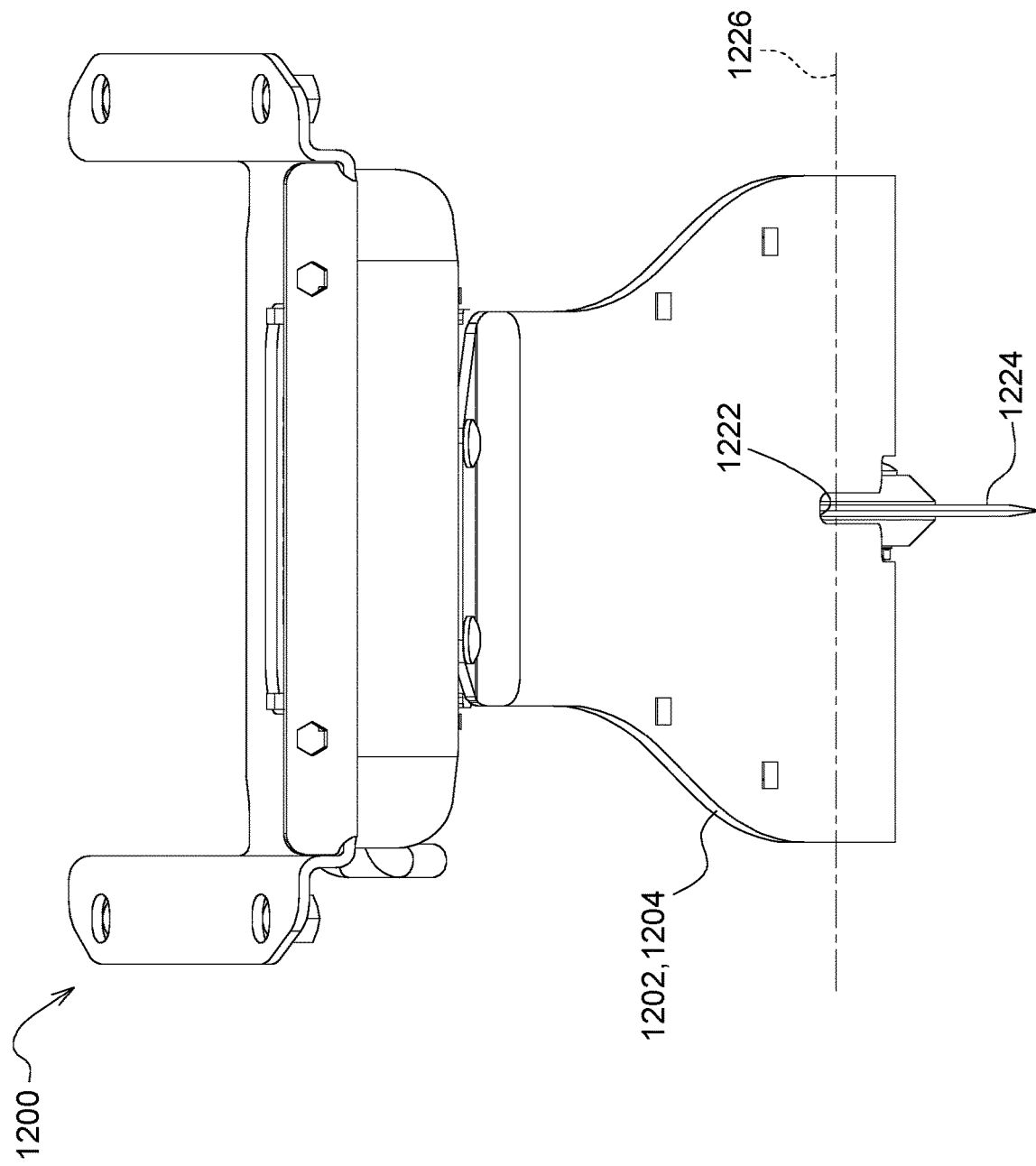
FIG. 14 is a front view of the stalk conditioner of FIG. 12.

FIGS. 12-14 show another example stalk condition 1200. The stalk conditioner 1200 is also similar to the stalk conditioner 100 with the exception of the differences described below. The stalk conditioner 1200 includes an arm 1202 that varies from the arm 106 of the stalk conditioner 100. The arm 1202 includes a bracket 1201 similar to bracket 204 of arm 106 and couples to a second bracket 1203 of the stalk conditioner 1200 in a manner similar to that described above with respect to the arm 106 and second bracket 104. Similar to the arm 106, the arm 1202 includes a base 1204 having a first end portion 1206 that has a planar shape and a second end portion 1208 that has a curved shape. The arm 1202 also includes a housing 1210 that extends from a first side 1212 of the base 1204, opposite a second side 1214. The housing 1210 includes opposing sides 1214 that are joined at a ridge 1216. In the illustrated example, the opposing sides 1214 include a vertical portion 1216 and an angled portion 1218 that are joined at a bend 1220. A slot 1222 formed in the arm 1202 extends along and through the ridge 1216 of the housing 1210 and through the base 1204. A blade 1224 is disposed in the slot 1222 and is rotatable therein about an axis of rotation 1226.

The arm 1202 also includes wipers 1228 formed in the housing 1210 at opposing sides of the slot 1222. The illustrated example shows that the wipers 1228 are integrally formed in the housing 1210. In other implementations, the wipers 1228 form or are part of a separate component. In still other implementations, the wipers 1228 may be omitted from the arm 1202. As shown, the wipers 1228 are closely aligned with a profile formed by the blade 1224. For example, in some instances, the wipers, or a portion thereof (such as an edge), are aligned with and positioned adjacent to a tapered portion of the blade, such as a portion similar to the tapered first portion 922 of the example blade 900. In some implementations, the wipers 1228 are offset from a surface of the blade 1224 by an amount within a range of one to three millimeters (mm) (0.04 to 0.12 inches (in.)). In other implementations, the offset of the wipers 1228 from the blade 1224 is greater or less than the indicated range. The wipers 1228 operate to remove material, such as crop material or soil, that may adhere to the blade 1224 during operation. Removal of this material promotes rotation of the blade 1224 within and relative to the arm 1202 as opposed to being dragged through the soil of a field and without rotation. The blade 1224 may be similar to the blade 107 or 900, described earlier. In other implementations, the blade 1224 may be similar to blade 1107. In still other implementations, the blade 1224 may be different from the blade 107, 900, or 1107.

In some implementations, wipers may have an arrangement in which a gap between the wipers and blade is omitted. For example, in some implementations, one or more wipers are spring loaded to cause the wiper to contact and ride against a surface of the blade. Over time, such an arrangement results in wear of one or both of the wipers and blade. However, a biasing force applied to spring loaded wipers cause the maintain contact with the blade notwithstanding a wearing away of material of the wipers, blade, or both due to the contact therebetween.

Figure 15:
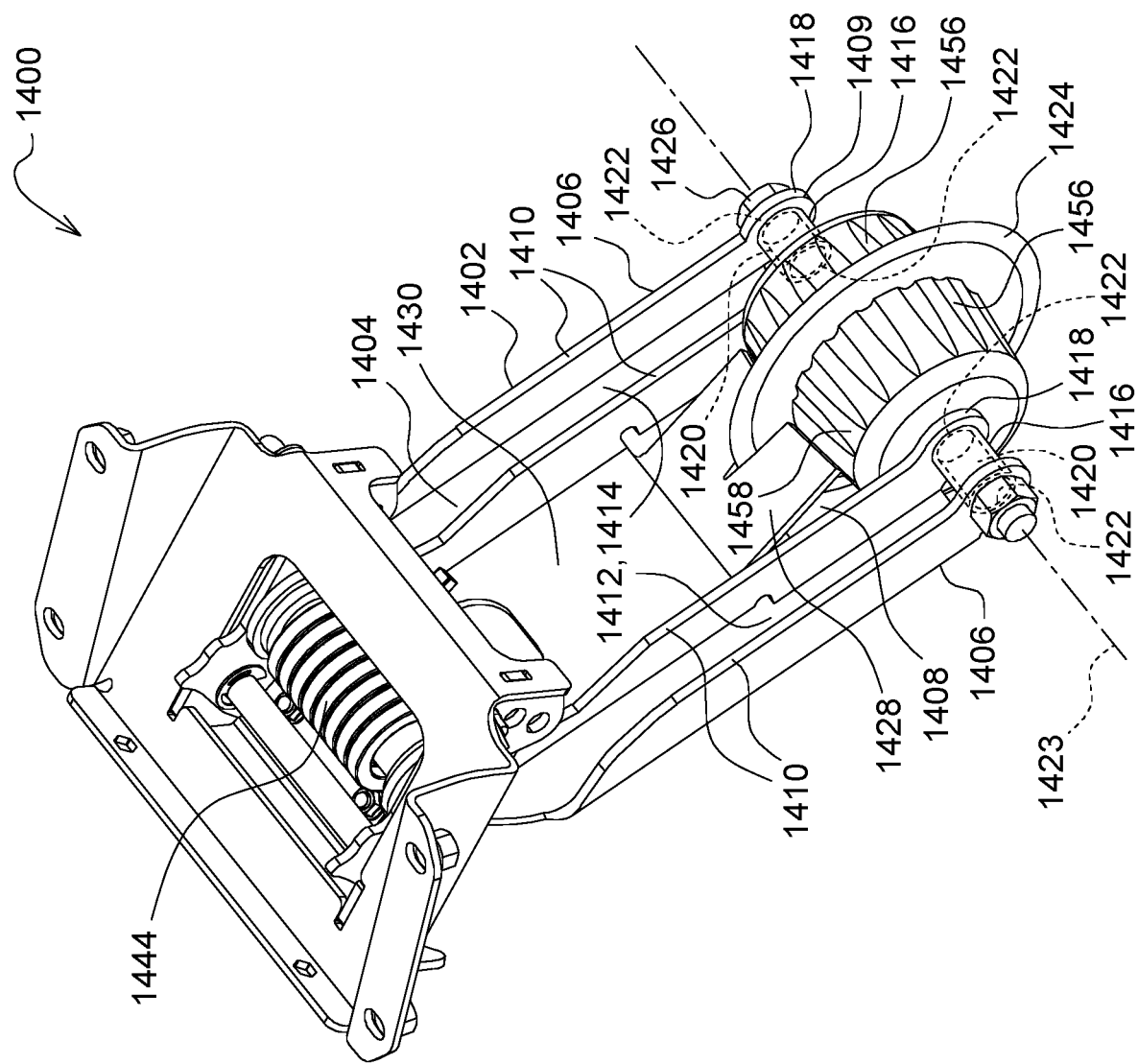
FIG. 15 is a perspective view of another example stalk conditioner, according to some implementations of the present disclosure.
Figure 16:
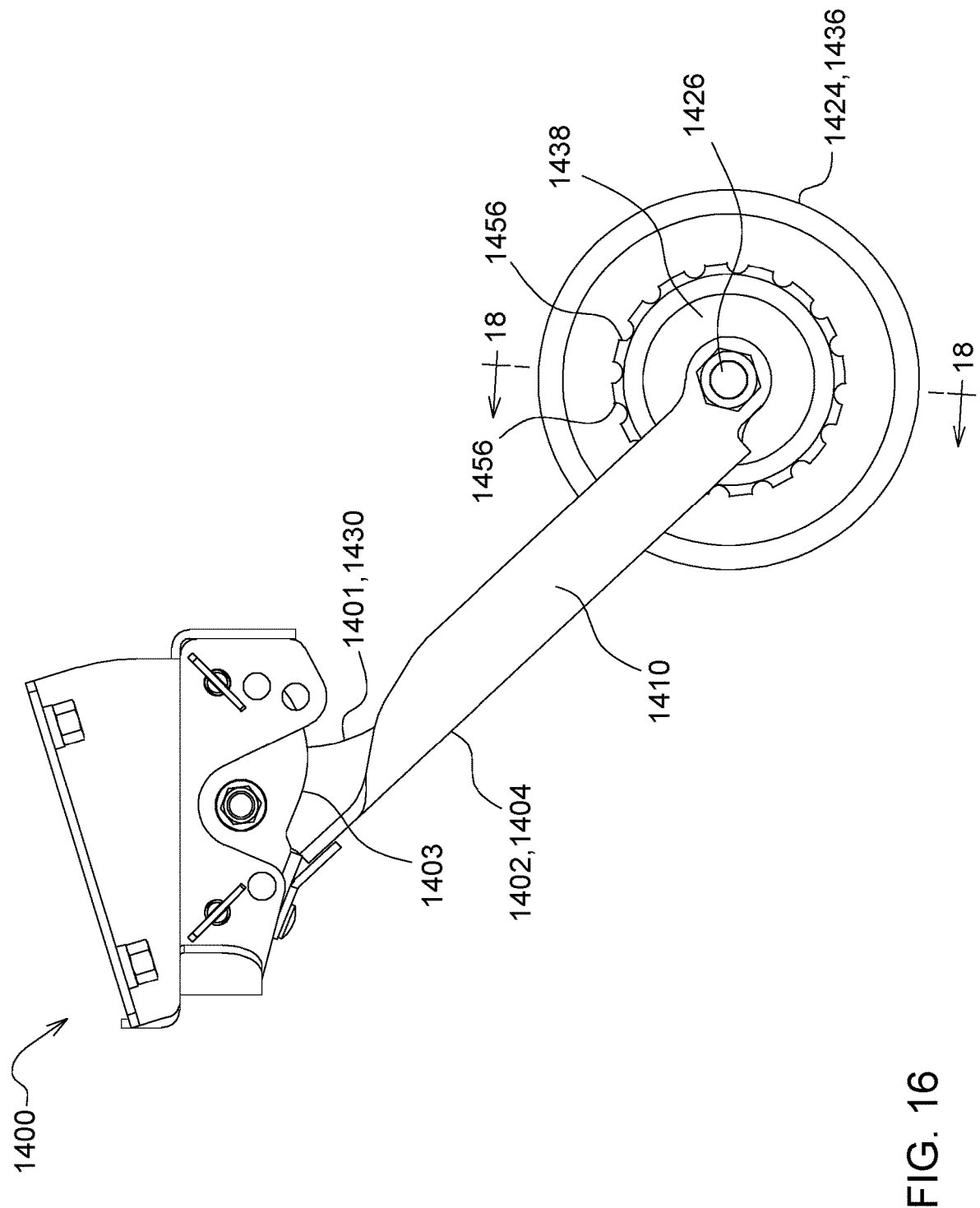
FIG. 16 is a side view of the stalk conditioner of FIG. 15.
Figure 17:
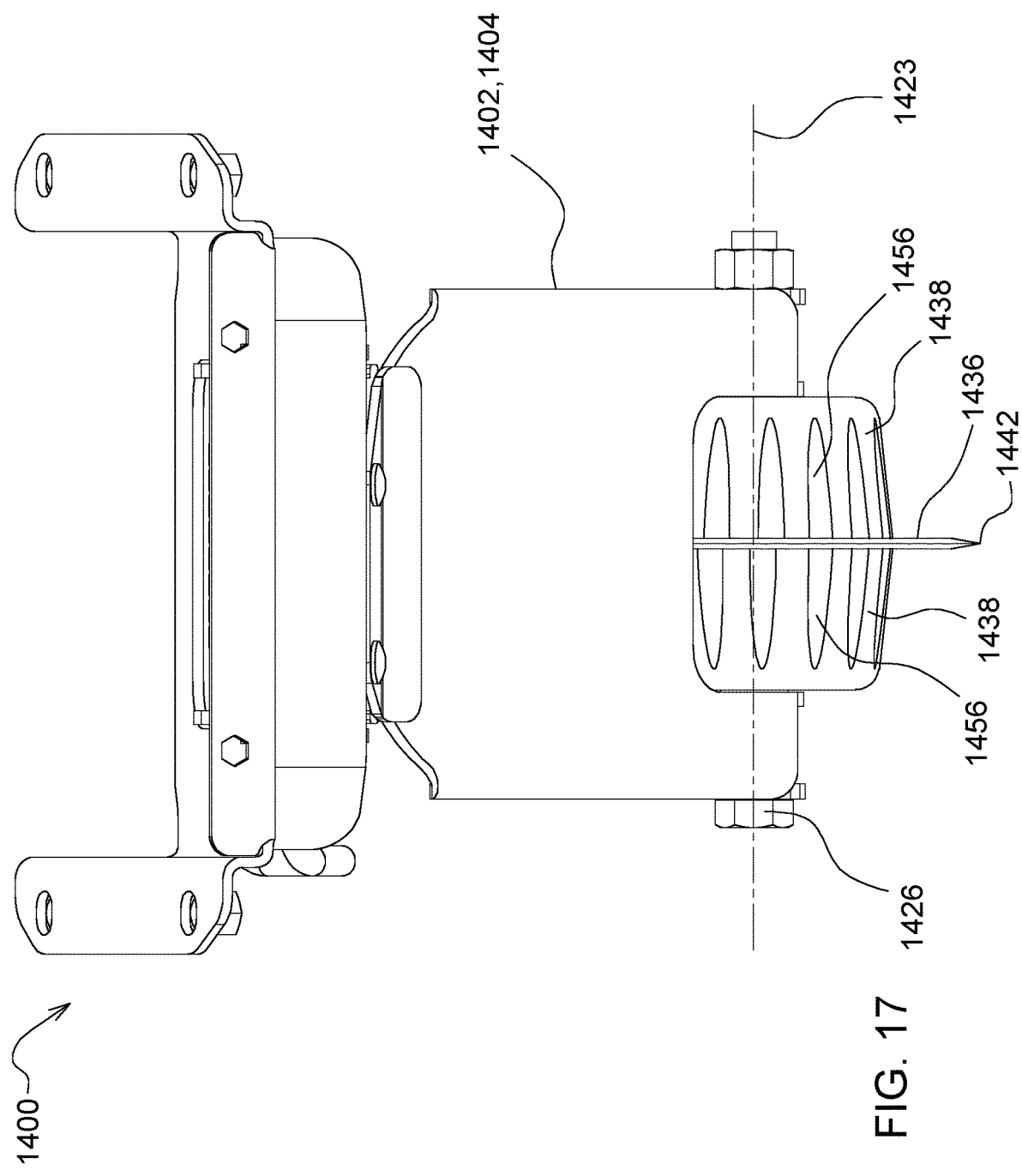
FIG. 17 is a front view of the stalk conditioner of FIG. 15.

FIGS. 14-16 show another example stalk conditioner 1400. The stalk conditioner 1400 is also similar to the stalk conditioner 100 with the exception of the differences described below. The stalk conditioner 1400 includes an arm 1402 that varies from the arm 106 of the stalk conditioner 100. The arms 1402 includes a bracket 1401 similar to bracket 204 of arm 106 and couples to a second bracket 1403 of the stalk conditioner 1400 in a manner similar to that described above with respect to the arm 106 and second bracket 104. The arm 1402 forms a generally planar shape, omitting a curved portion that is included in the arm 106 and 1202 of the example arm 106 and arm 1202, described earlier. The arm 1402 includes a planar base 1404 that defines legs 1406 that are laterally offset to form a slot 1408 that is open at an end 1409 of the arm 1402. Pairs of flanges 1410 extend from the base along a longitudinal length of the arm 1402, including along the respective legs 1406. The pairs of flanges 1410, along with a portion of the base 1404 extending therebetween, form a U-shaped beam, a portion of the base 1404 forming a web 1412 between the adjacent flanges 1410. The U-shaped beams increases the strength and rigidity of the arm 1402, particularly increased bending strength and rigidity. A channel 1414 is defined by each pair of flanges 1410 and the portion of the base 1404 defining the web 1412 extending therebetween. In the illustrated example, the flanges 1410 are perpendicular to the base 1404. In other implementations, the flanges 1410 may extend from the base 1404 at a different angle, such as an oblique angle.

Sleeves 1416 extend between each of the pairs of adjacent flanges 1410 at ends 1418 of the legs 1406. The sleeves 1416 define passageways 1420 that align with openings 1422 formed in each of the associated flanges 1410. The sleeves 1416 are aligned to define an axis of rotation 1423 of a roller 1424 received into the slot 1408 and rotatably coupled to the arm 1402 by a shaft 1426 that is received into the aligned passageways 1420. Example shafts 1426 include fasteners (e.g., a bolt), a rod, or a pin.

The arm 1402 also includes a wiper 1428 that extends obliquely from the base 1404. In the illustrated example, the wiper 1428 is extends form the same side of the base 1404 as the flanges 1410. However, in other implementations, the one or more of the flanges 1410 may extend from a side of the base 1404 that is different from a side from which the wiper 1428 extends. In some implementations, the wiper 1428 is an integrally formed part of the base 1402. In other implementations, the wiper 1428 is or forms part of a separate component that is coupled to the base 1402. For example, in the illustrated example, the wiper 1428 forms part of a stiffener 1430 that is attached to the base 1404, such as by welding, an adhesive, or by fasteners. In some implementations, the wiper 1428 may be a spring-loaded wiper as described earlier. The stiffener 1430 provides increased strength to the arm 1402. In some implementations, the stiffener 1430 includes the two inwardly disposed flanges 1410. In some implementations, the stiffener 1430 includes the bracket 1401.

Figure 18:
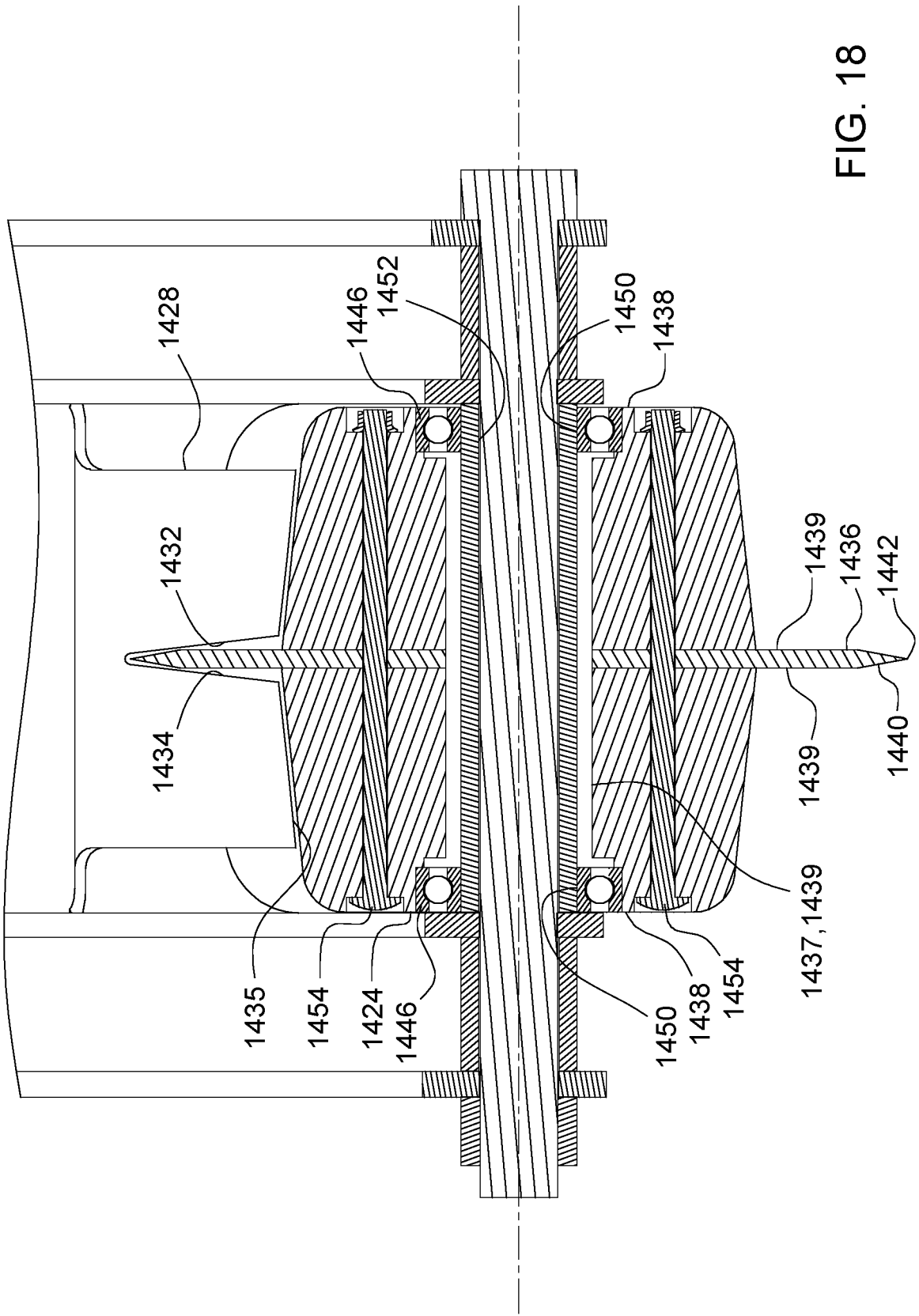
FIG. 18 is a cross-sectional view of an example roller and a profile of an adjacent example wiper disposed of the stalk conditioner of FIG. 15.

FIG. 18 is a cross sectional view of the roller 1424 along with a profile of the wiper 1428. As shown, the wiper 1428 defines a slot 1432 that conforms to a profile shape of the roller 1424. In some implementations, an edge 1434 of the wiper 1428 that defines the slot 1432 is in close proximity to the roller 1424. For example, is some implementations, the edge 1434 is offset from the roller 1424 by an amount within a range of one to three millimeters (mm) (0.04 to 0.12 inches (in.)) to form a gap 1435 therebetween. In other implementations, the offset of the wiper 1428 from the roller 1424 is greater or less than the indicated range.

The roller 1424 includes a blade 1436 and side portions 1438 disposed on opposing sides 1439 of the blade 1436. The blade 1436 is disc-shaped and includes a tapered portion 1440 that defines an edge 1442 that, similar to edge 223 of the blade 107, functions to split stalks as the stalk conditioner 1400 is moved through a field, such as along a crop row during harvesting. The side portions 1438 extend from the blade 1436 to provide an increased contact area to engage with and crush stalks that remain attached to the field after harvesting. The biasing force provided by spring 1444 (shown in FIG. 15) presses the roller 1424, including the side portions 1438, against the stalks, resulting in the stalks both being split by the blade 1436 and pressed into the ground by both the blade 1436 and the side portions 1438, thereby breaking or crushing the stalks.

Further, the stalk condition 1400 and, more particularly, the arm 1402 is configured to avoid contact with the ground or object located on the ground. Rather, the roller 1424 is positioned on the stalk condition 1400 so that roller 1424 primarily engages the stalk stubble and other objects located on the ground.

Bearings 1446 are received into cavities 1448 formed in the side portions 1438 and are received onto an exterior surface 1437 of a hollow sleeve 1439 that extends laterally through the roller 1424. The bearings 1446 provide for rotation of the blade 1436 and side portions 1438 and the sleeve 1439 and, consequently, rotation of the roller 1424 relative to the arm 1402. The sleeve 1439 defines a central passage 1452 that receives the shaft 1426. In other implementations, one or more bushings can be used in place of or in combination with one or more bearings. In still other implementations, other types of bearing components or bearing material can be used or, alternatively, bearing materials or components may be omitted. Additionally, in the illustrated example, the roller 1424 includes fasteners 1454 (such as bolts and nuts) to attach the blade 1436 and the side portions 1438 together. In other implementations, the blade 1436 and side portions 1438 can be attached in other ways, such as with pins, adhesives, threaded connections, and mating features. Further, in some implementations, the blade 1436 and the side portions 1438 may be integrally formed as a unitary component.

Returning to FIGS. 14-16, the roller 1424 includes traction features that increase traction between the roller 1424 and an object engaged with the roller to promote rotation of the roller 1424 relative to the arm 1424. In the illustrated example the traction features include a plurality of recesses 1456 formed in an exterior surface 1458 of the side portions 1438. The recesses 1456 increase traction of the roller 1424 and promote rotation of the roller 1424 relative to the arm 1402, such as when the roller 1424 engages the stalks as the stalk condition 1400 is moved along the ground, such as during a harvesting operation.

Without in any way limiting the scope, interpretation, or application of the claims appearing below, a technical effect of one or more of the example implementations disclosed herein is to crush or break stalks while simultaneously slicing the stalks to improve decomposition of the stalk stubble. Another technical effect of one or more of the example implementations disclosed herein is to provide a single assembly that provides for both crushing or breaker the stalks and slicing the stalks. Another technical effect of one or more of the example implementations disclosed herein is to provide an assembly that is precisely alignable with each row of crop so that stalk stubble remaining after harvesting is immediately engaged after harvesting, thereby avoiding a separate stalk conditioning treatment in a separate operation. Consequently, time, labor, and fuel costs are reduced.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A stalk conditioner to deflect and cut crop stalks extending from the ground, the stalk conditioner comprising:
    a first bracket;
    an arm coupled to the first bracket and pivotable relative thereto; and
    a blade rotatably coupled to the arm
        wherein the arm comprises:
            a base comprising:
                a first side;
                a second side; and
                a curved portion; and
            a housing extending from the first side of the base, wherein a slot extends through the base and the housing, and
        wherein the blade is received into the slot.

2. The stalk conditioner of claim 1, further comprising:
    a second bracket interdisposed between the first bracket and the arm; and
    a shaft coupled to the second bracket, wherein the arm is pivotable on the shaft.

3. The stalk condition of claim 2, further comprising a resilient component that biases the arm towards a lowered position,
    wherein displacement of the arm from the lower position to a raised position increases a biasing force generated by the resilient component that acts to restore the arm towards the lowered position.

4. The stalk conditioner of claim 3, wherein the resilient component is a coil spring that defines a central passage, and wherein the shaft extends through the central passage of the coil spring.

5. The stalk conditioner of claim 1, wherein the first bracket comprises a first lateral side and a second lateral side,
wherein each of the first lateral side and the second lateral side comprises a first end portion and a second end portion, opposite the first end portion, and
wherein a first plurality of aligned aperture sets is formed on one of the first end portion or the second end portion of the first lateral side and the second lateral side, and
further comprising a first pin that is selectively receivable into the any of the first plurality of aligned aperture sets to adjust an angle of arm relative to the first bracket.

6. The stalk conditioner of claim 1, wherein the arm comprises a first surface, and wherein the blade extends beyond the first surface.

7. The stalk conditioner of claim 6, wherein the first surface is planar.

8. The stalk conditioner of claim 1, further comprising a roller, wherein the roller comprises the blade and side portions disposed on opposing sides of the blade.

9. The stalk conditioner of claim 1, wherein the housing comprises:
a first side extending longitudinally along the base;
a second side longitudinally along the base and located adjacent to the first side;
a first recess formed in the first side, the first recess defining a first tab; and
a second recess formed in second the side, the second recess defining a second tab,
wherein an axis of rotation of the blade extends through the tabs.

10. The stalk conditioner of claim 1, wherein the arm comprises a slot, and wherein the blade is received, at least partially, within the slot.

11. The stalk conditioner of claim 10, wherein the slot is open at an end of the arm.

12. The stalk conditioner of claim 1, wherein the arm further comprises a wiper disposed adjacent to the blade.

13. The stalk conditioner of claim 12, wherein the wiper conforms to a shape of the blade.

14. The stalk conditioner of claim 8, wherein the roller comprises a plurality of traction features formed on an exterior surface thereof.

15. The stalk conditioner of claim 14, wherein the plurality of traction features comprises a plurality of recesses.

16. A stalk conditioner to deflect and cut crop stalks extending from the ground, the stalk conditioner comprising:
a first bracket configured to be mounted to a piece of agricultural equipment, the first bracket comprising:
a mounting surface;
a first lateral side extending from the mounting surface;
a second lateral side extending from the mounting surface, the second lateral side laterally offset from the first lateral side;
a first plurality of aligned aperture sets formed through the first lateral side and the second lateral side at first end portions thereof; and
a second plurality of aligned aperture sets formed through the first lateral side and the second lateral side at second end portions thereof;
a second bracket received into the first bracket, the second bracket comprising:
a first lateral side positioned adjacent to the first lateral side of the first bracket;
a second lateral side positioned adjacent to the second lateral side of the first bracket;
first aligned apertures formed in the first lateral side of the second bracket and the second lateral side of the second bracket, the first aligned apertures alignable with any of the first plurality of aligned aperture sets of the first bracket to alter an angular relationship between the first bracket and the second bracket; and
second aligned apertures formed in the first lateral side of the second bracket and the second lateral side of the second bracket, the second aligned apertures alignable with any of the second set of aligned aperture sets of the first bracket to alter the angular relationship between the first bracket and the second bracket;
an arm pivotably coupled to the second bracket, the arm pivotably movable between a lowered position and a raised position, the arm biased towards the lowered position, the arm comprising a longitudinally extending slot; and
a single blade received into the longitudinally extending slot and rotatable relative to the arm,
wherein the longitudinally extending slot is configured to accommodate the single blade.

17. The stalk conditioner of claim 16, wherein the arm comprises a planar base, and wherein the slot is formed in an end of the planar base.

18. The stalk conditioner of claim 17, wherein the arm comprises:
a base comprising:
a first side;
a second side configured to engage the ground; and
a curved portion; and
a housing extending from the first side of the base of the arm, wherein the longitudinally extending slot extends through the base of the arm and the housing, and
wherein the blade extends beyond the second side of the base.

19. The stalk conditioner of claim 17, further comprising:
a first pin receivable into the any of the first plurality of aligned aperture sets of the first bracket and the first aligned apertures of the second bracket; and
a second pin receivable into any of the second plurality of aligned aperture sets of the first bracket and the second aligned apertures of the second bracket.

* * * * *